INVENTOR.
H. Wagemann
BY
Bryant & Lowry
ATTYS.

Dec. 15, 1959 H. WAGEMANN 2,917,232

DECIMAL POINT MECHANISM

Filed Oct. 26, 1955 9 Sheets-Sheet 2

INVENTOR.
HEINRICH WAGEMANN

BY George V. Hall

ATTORNEY

INVENTOR
HEINRICH WAGEMANN
BY [signature]
ATTORNEY

Dec. 15, 1959 H. WAGEMANN 2,917,232

DECIMAL POINT MECHANISM

Filed Oct. 26, 1955 9 Sheets-Sheet 4

INVENTOR.
H. Wagemann
BY
Bryant & Lowry
ATTYS.

Dec. 15, 1959 H. WAGEMANN 2,917,232

DECIMAL POINT MECHANISM

Filed Oct. 26, 1955 9 Sheets-Sheet 5

INVENTOR.
HEINRICH WAGEMANN

BY George V. Hall

ATTORNEY

Dec. 15, 1959 H. WAGEMANN 2,917,232

DECIMAL POINT MECHANISM

Filed Oct. 26, 1955 9 Sheets-Sheet 6

INVENTOR.
HEINRICH WAGEMANN

BY George V. Hall

ATTORNEY

INVENTOR.
HEINRICH WAGEMANN
BY George V. Hall
ATTORNEY

Dec. 15, 1959 H. WAGEMANN 2,917,232

DECIMAL POINT MECHANISM

Filed Oct. 26, 1955 9 Sheets-Sheet 8

INVENTOR.

H. Wagemann

BY Bryant & Lowry

ATTYS.

Dec. 15, 1959 H. WAGEMANN 2,917,232

DECIMAL POINT MECHANISM

Filed Oct. 26, 1955 9 Sheets-Sheet 9

INVENTOR
HEINRICH WAGEMANN
BY [signature]
ATTORNEY

United States Patent Office 2,917,232
Patented Dec. 15, 1959

2,917,232

DECIMAL POINT MECHANISM

Heinrich Wagemann, Rastatt, Germany, assignor to Monroe Calculating Machine Company, Orange, N.J., a corporation of Delaware Application October 26, 1955, Serial No. 542,967

Claims priority, application Germany October 30, 1954

9 Claims. (Cl. 235—60.15)

This invention relates to decimal point mechanism for calculating machines. More particularly, the invention relates to means automatically operable to locate and print the decimal point in a printing calculator.

There is disclosed, in prior art non-printing calculating machines, means automatically operable to locate the decimal point. Prior art printing calculators, however, do not embody automatic means for locating and printing the decimal point.

It is accordingly the primary object of the invention to provide a printing calculator wherein the decimal point is automatically located and printed.

A more specific object of the invention is to automatically locate a decimal point with respect to the digit type members of a printing calculator and then to print the decimal point in conjunction with a digit printing operation.

A further and more specific object of the invention is to combine decimal printing mechanism with conventional digit printing mechanism in a printing calculator, and to provide automatic means to control operation of the decimal printing mechanism in conjunction with digit printing operations.

The invention is particularly adaptable for use in a ten key type printing calculator in which type of machine, a preferred embodiment of the invention is herein disclosed. In this machine, each factor (dividend and divisor) of a problem of division is set in a pin carriage upon successive depression of keys of the ten key beyboard corresponding to the digits of the factor from higher to lower orders. Furthermore, a decimal key is depressed in proper sequence with the digit keys. Subsequent to this setting operation, a key (dividend or divisor) controlling the type of factor entering operation is depressed. In response to depression of this factor entering key, the factor is entered into the machine. Entry of the factors of a calculation conditions the printing mechanism for subsequent printing of the decimal with the quotient which is registered in a counter-register. A total taking operation for this register includes printing of the quotient with the decimal.

The digit type members of the printing mechanism are adjusted from normal zero position in accordance with the initial strokes respectively of operating racks and then the printing mechanism is operated. After the printing operation, the racks, in their return strokes, restore the type members to normal zero position. The excursions of the operating racks are controlled by a pin carriage, or in total taking operations are controlled in accordance with values registered in either the accumulator register or in the counter register. The present invention, however, concerns only the printing operation in conjunction with a total taking operation of the counter register to print the quotient.

It is old and well known, in the prior art, to provide function control keys each operable to initiate a machine cycle wherein operating racks for type members are controlled in their excursions in accordance with pin carriage settings in a value entering operation, or in accordance with zeroizing movement of the numeral wheels in a selected one of several registers in a total taking operation. A complete understanding of the operation of the devices of the invention therefore will necessitate, with respect to these operations, only a description of the ordinal relationship of the pin rows of the pin carriage and of the numeral wheels with respect to the racks which control the digital adjustments of the type members. Furthermore, it will be understood that the program of division is performed in well-known manner, and concerns the operation of the devices of the invention only in the provision to register the results in given orders of the counter register as determined by the initial ordinal operating positions of the registering mechanism with respect to the register numeral wheels. The invention, however, will best be understood from the following description with reference to the accompanying drawings in which:

Figure 6:
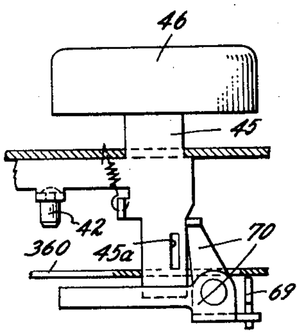
Figure 7:
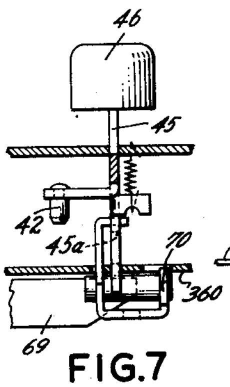
Figure 8:
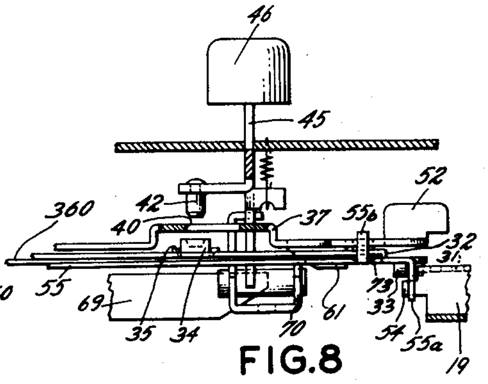

Figs. 6, 7, and 8 are fragmentary detailed views with parts broken away and in section of the decimal key.

Figures 9, 10:
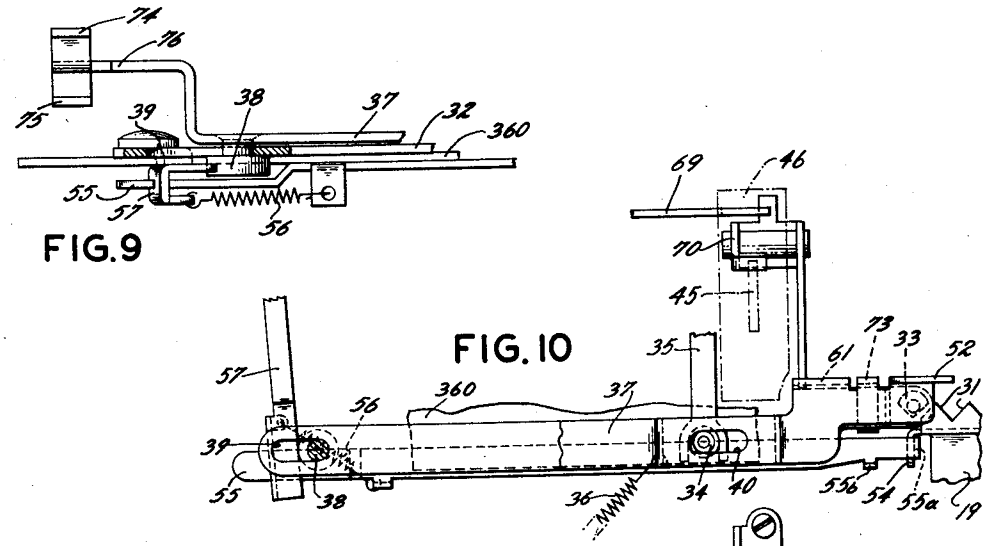

Fig. 9 is a fragmentary side elevation with parts in section of drive means for the decimal adjusting mechanism.

Fig. 10 is a plan view with parts broken away of the drive means for the decimal adjusting mechanism.

Figures 11, 12:
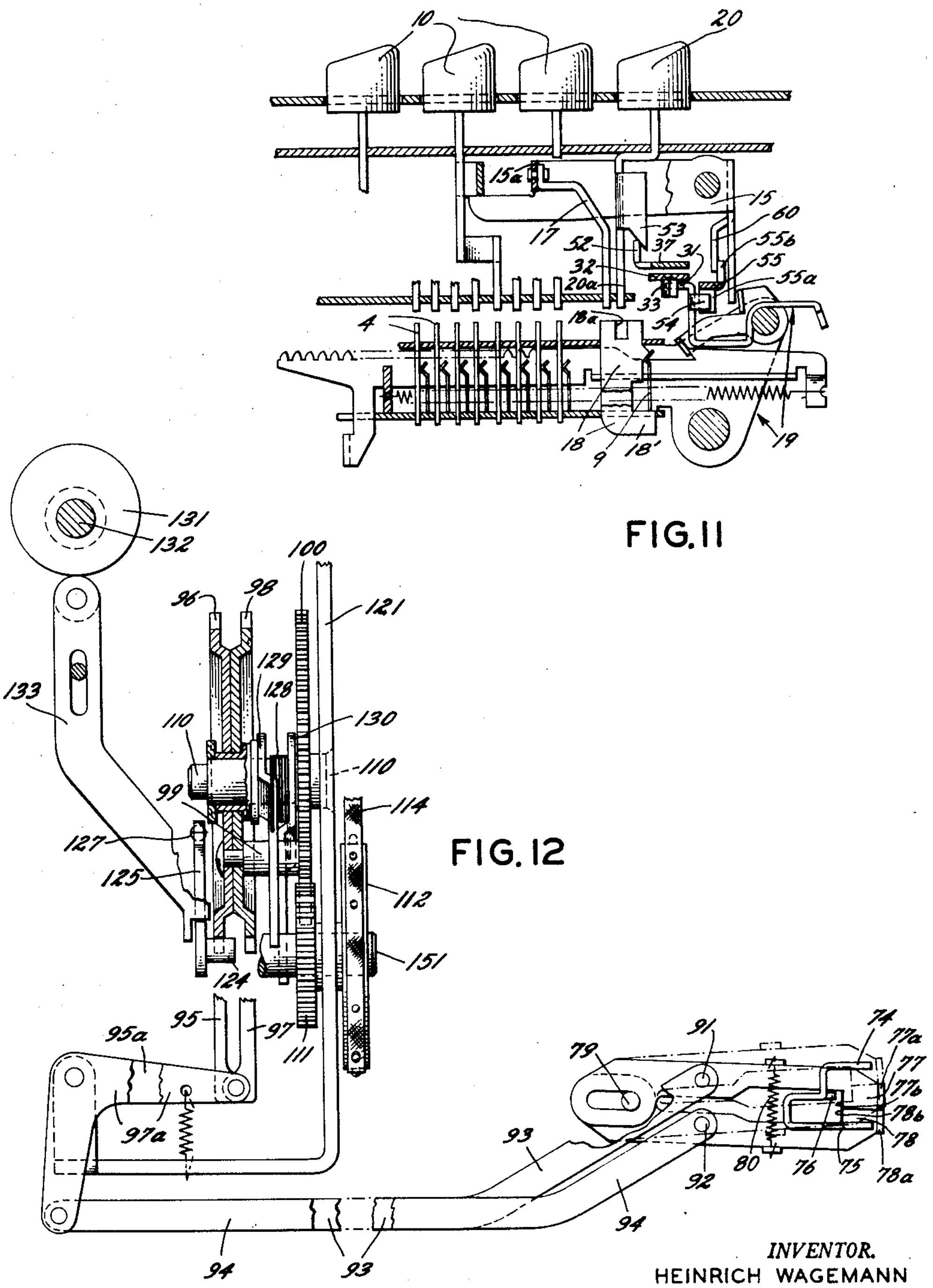

Fig. 11 is a side elevation with parts in section of the ten key keyboard and the pin carriage.

Fig. 12 is a side elevation with parts in section of decimal adjusting mechanism and the drive means therefor.

Figures 13, 14, 15, 20:
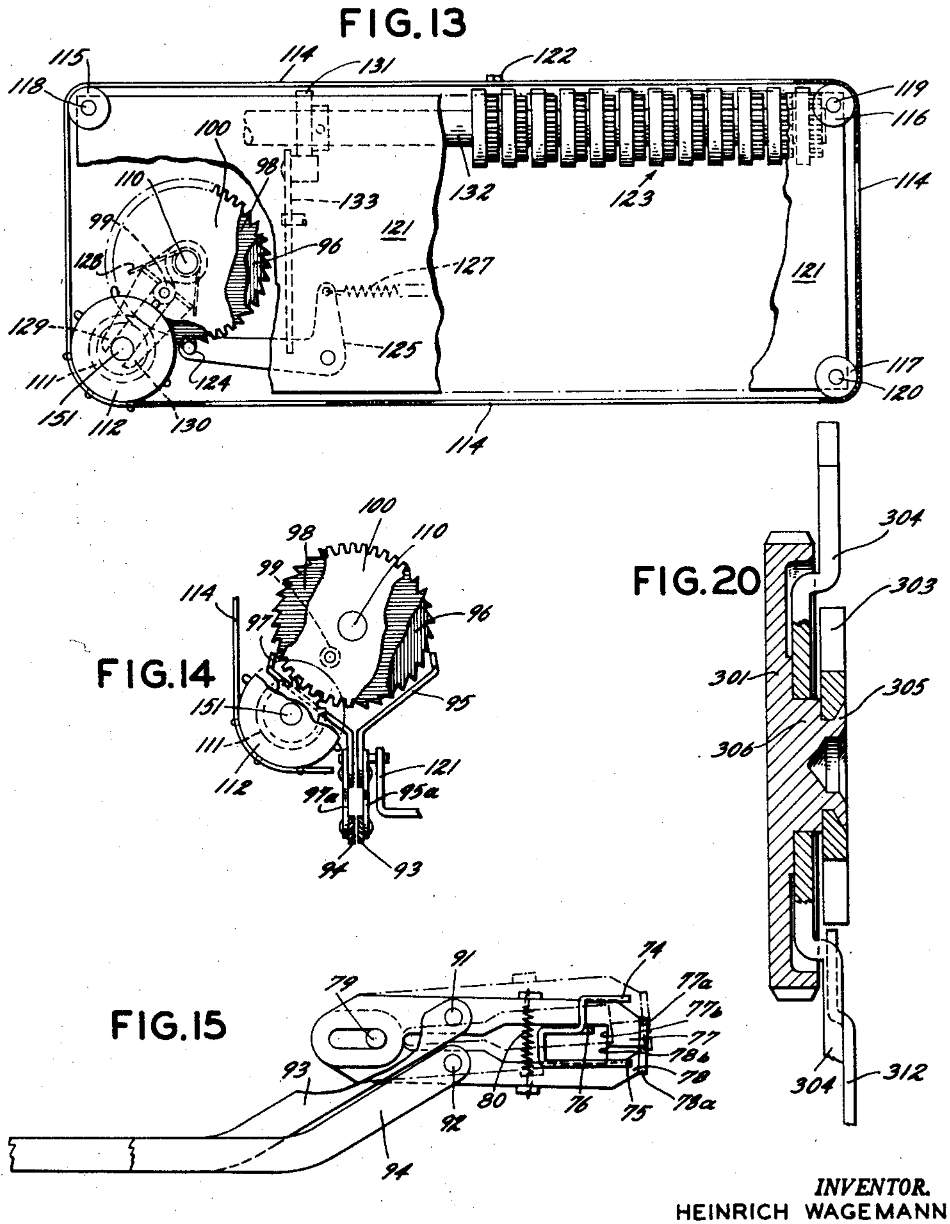

Fig. 13 is a front elevation with parts broken away of the decimal adjusting mechanism.

Fig. 14 is a fragmentary detailed front elevation of the decimal adjusting mechanism.

Fig. 15 is a fragmentary side elevation of the drive means for the decimal adjusting mechanism.

Figure 16:
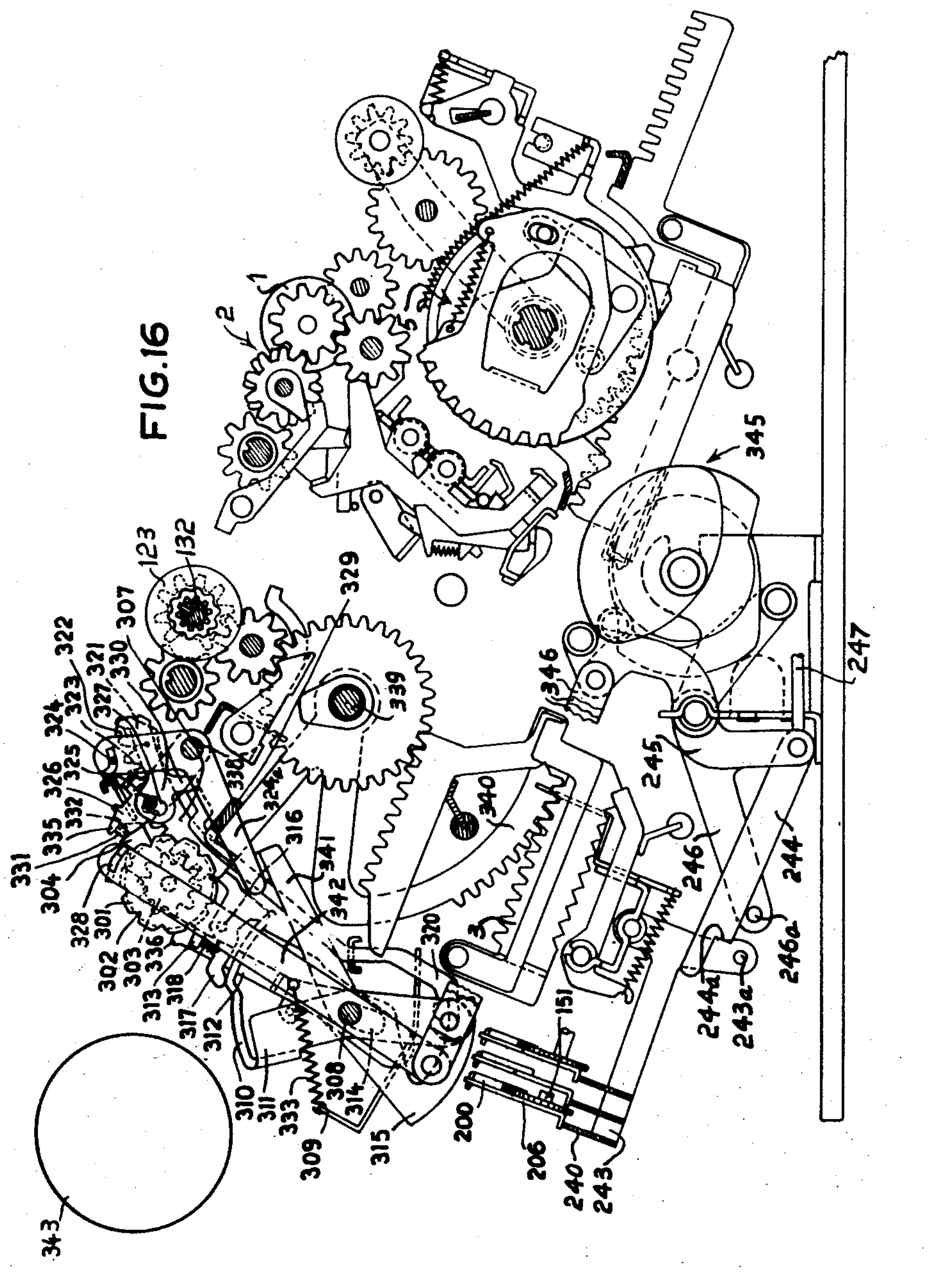

Fig. 16 is a left side elevation of the printing mechanism, the actuating racks therefor and the driving means.

Figures 17A, 17B:
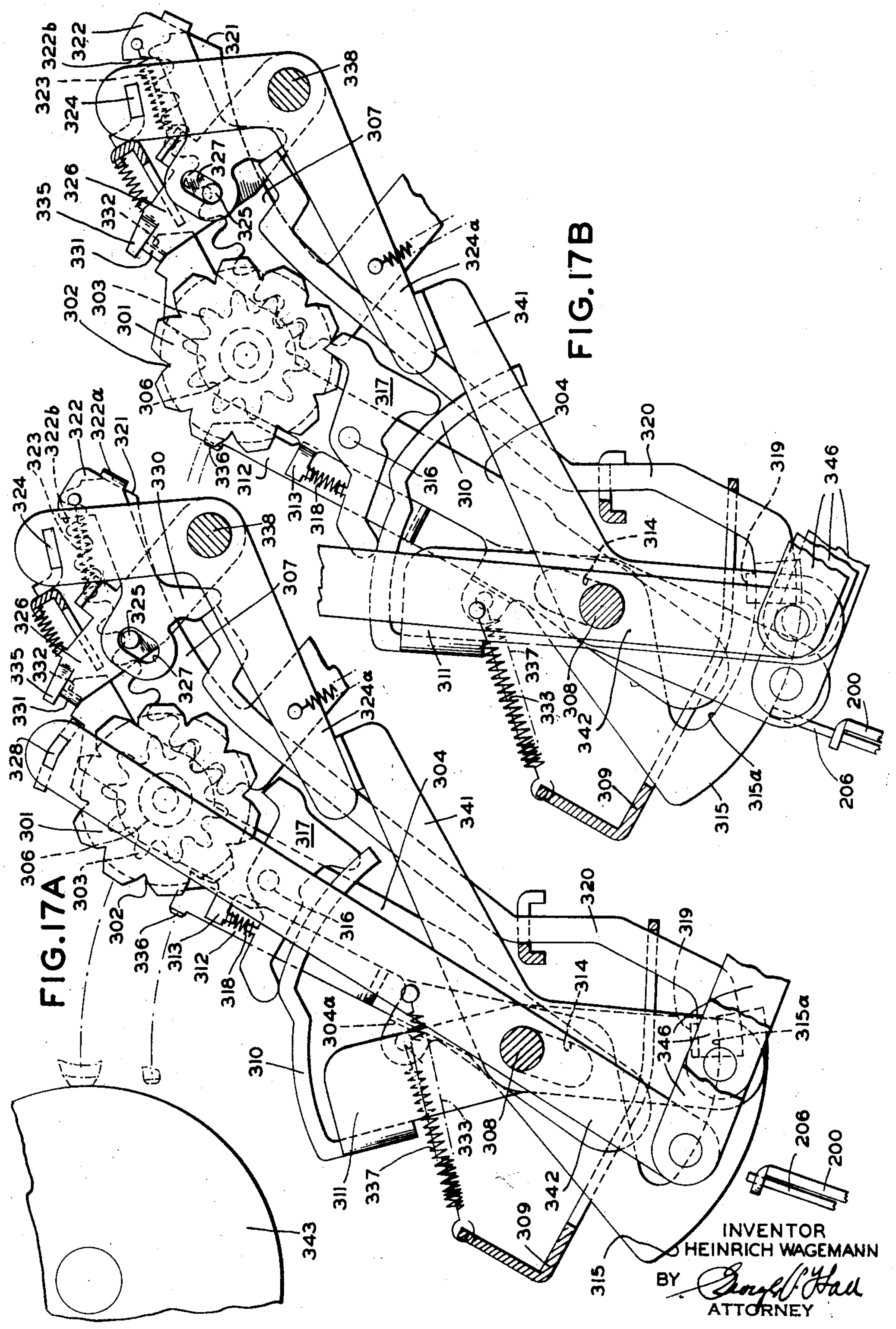

Fig. 17A is an enlarged right side elevation of the printing mechanism in normal position.

Fig. 17B is a view similar to Fig. 17A with the parts in an operated position.

Figure 18:
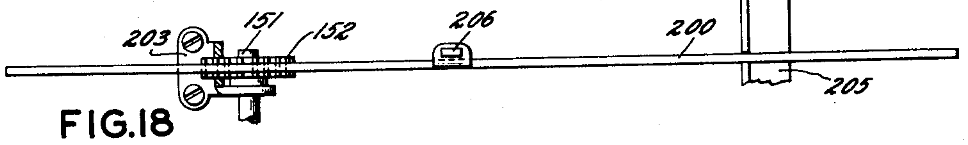

Fig. 18 is a plan view of the means for selectively enabling the decimal printing mechanism.

Figure 19:
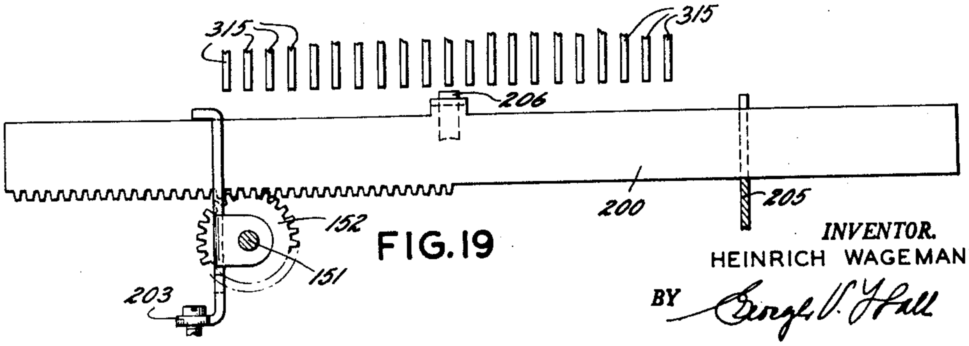

Fig. 19 is a front elevation of the parts of Fig. 18.

Fig. 20 is an enlarged sectional view of a digit printing wheel unit and associated decimal printing member.

*General description*

The particular type of ten key calculating machine in which the invention is embodied is more fully disclosed in applicant's co-pending application Serial No. 446,371 filed on July 28, 1954 and now abandoned. In this machine, an ordinal series of twenty-two racks (Fig. 16) are reciprocably operable to adjust a respective digited type wheel 301 (Figs. 16, 17A, 17B) of a printing unit as later described.

A pin carriage 19 (Fig. 11) comprises eleven ordinal rows of pins 4. Pin carriage 19 is normally positioned, in the usual manner, to the right of the lowest order rack 3 and is adapted to be step shifted toward the left to bring depressed pins of the eleven rows successively from higher to lower orders into controlling position with respect to the eleven lowest order racks 3 from lower to higher orders. The depressed pins 4 of the key rows act as stops, in the usual manner, for forward extensions (not shown) of the eleven lowest order racks 3. Accordingly, in each cycle of operation, the forward excursions of racks 3 under control of the pin carriage is determined in accordance with depressed pins 4. During the forward excursions of racks 3, type wheels 301 are rotated to the values corresponding to the respective pin carriage settings. Then the printing operation is performed and the type wheels are restored during the return strokes of the racks.

The above operations with respect to control of the printing mechanism are all conventional and well known in listing machines. In this machine, however, the reciprocatory operation of racks 3 under control of pin carriage 19 in a printing operation is not simultaneously adapted to perform a registering operation as is usual in listing machines. Instead, what may be termed a preregistering operation is performed upon reciprocation of racks 3 under control of the pin carriage. This operation comprises the setting of differentially settable rotary digital actuator units 5 for an accumulator register comprising an ordinal series of numeral wheels 1 (Figs. 1, 16), later described.

There are eleven rotary digital actuator units 5 and associated tens transfer mechanism. Each of the digital actuator units is adapted, through a setting train (not shown) to be set upon reciprocatory operation of a respective rack 3 in accordance with the digital value corresponding to the setting of the associated type wheel 301 by said rack. After the setting operation, the rotary actuating means may be cycled one or a plurality of times. Consequently high speed rotary registering operation is achieved in conjunction with listing in the usual manner. This principle of listing in conjunction with setting of rotary actuating mechanism is broadly disclosed in Patent No. 1,467,198. However, the setting of the rotary digital actuators 5 and the control of their registering operations does not concern the decimal devices of the present invention except in the provision to effect registration of a dividend in particular orders of the accumulator register. With this provision, the quotient will be registered in predetermined orders of the counter register. Thus a total taking operation from the counter register will control the excursions of racks 3 to control printing in the appropriate orders with respect to a predetermined decimal location as will appear later.

The ordinal series of numeral wheels 1 (Figs. 1, 16), comprising the accumulator register, is mounted on a transversely shiftable carriage 2 above digital actuators 5. There are twenty-two accumulator wheels 1. That is, a wheel 1 corresponding ordinally to each of the twenty-two type wheels 301 and racks 3. When carriage 2 is in its rightmost position (Fig. 1), the eleven highest order wheels 1 are positioned for registering operation by the eleven rotary actuators 5 which are settable upon operation of the eleven lowest order racks 3 under control of pin carriage 19 (Fig. 11). As carriage 2 is ordinally shifted to the left, the eleven lower order wheels 1 are successively moved into registering position with respect to actuators 5 as the higher order wheels are moved successively out of registering position. When carriage 2 has been shifted to its leftmost position, the eleven lowest order wheels 1 will be in registering position with respect to actuators 5.

Figure 1:
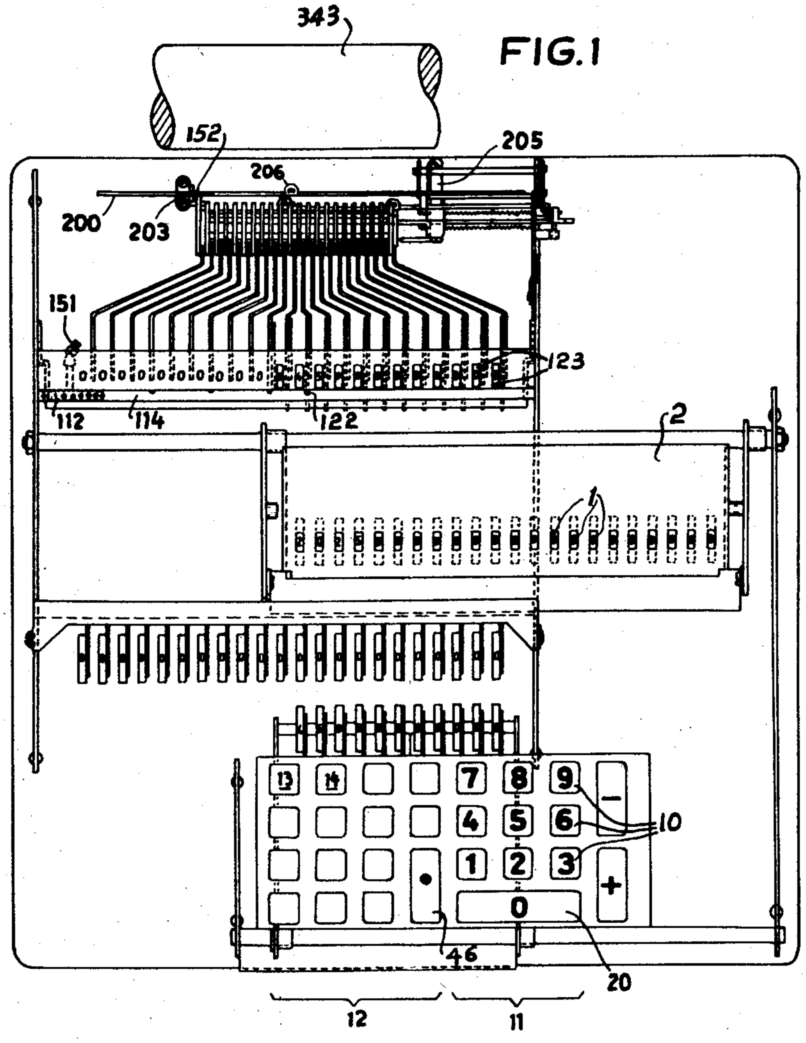
Fig. 1 is a plan view of the calculating machine.

A counter register comprises an ordinal series of twelve numeral wheels 123 (Figs. 1, 16). The counter register is non-shiftable and wheels 123 thereof are in fixed ordinal alignment with the twelve lowest order type wheels 301. A total taking operation for counter wheels 123 will control the excursions of the respective racks 3 to adjust the ordinally corresponding type wheels 301. A total taking operation from the counter register is initiated upon depression of one of the control keys of a keyboard 12.

A count for each registering cycle of the machine will be registered on a wheel 123 of the counter register by an ordinally shiftable counting finger (not shown). This counting finger is entrained for shifting operation with accumulator carriage 2 but in the reverse direction. When carriage 2 is in its rghtmost position (Fig. 1), the counting finger will be in leftmost shifted position for registering in the highest order wheel 123 of the counter register. Therefore as carriage 2 is shifted toward the left to bring the successive lower order accumulator wheels 1 into the range of digital actuators 5, the counting finger will be shifted toward the right into registering position with respect to the successive lower order counting wheels 123. This principle of operation is old and well known in calculating machine art.

*Pin carriage control*

Figure 3:
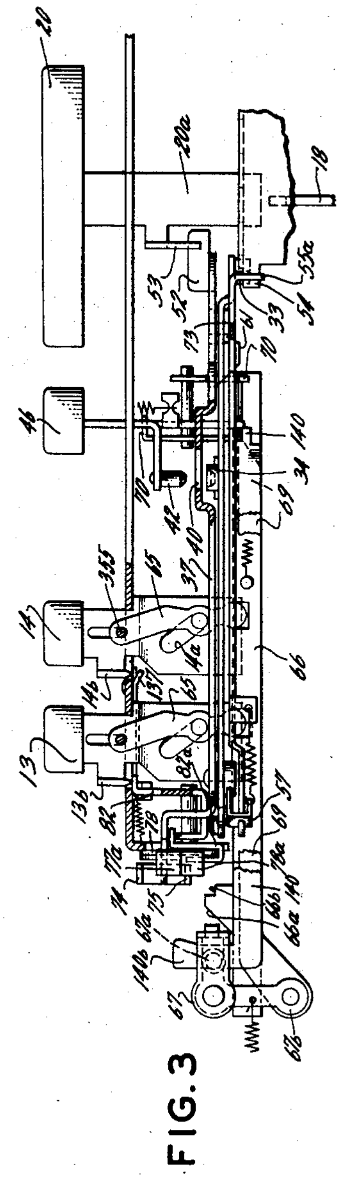
Fig. 3 is a front elevation of the keyboard.

Pin carriage 19 (Fig. 11) is spring biased toward the left, in the usual manner, and is normally restrained in rightmost shiftable position by an escapement mechanism. The escapement mechanism is adapted to be operated upon each depression of 1–9 digit keys 10 and a zero key 20 of a ten key keyboard 11 (Figs. 1, 2, 3) to enter the corresponding values in a row of pins 4 and to step shift carriage 19 one ordinal position to the left. Upon cyclic operation of the machine, carriage 19 is restored to its normal right end position after performing its control functions. The above operations are well-known conventional control operations in a ten key calculating machine. There is, however, a control operation in connection with the escapement mechanism upon depression of zero key 20 which is essential to the decimal location devices of the invention.

The escapement mechanism is more fully disclosed in my aforesaid application Serial No. 446,371 and comprises an ordinal series of vertically adjustable stop slides 18 (Fig. 11) located in pin carriage 19 at the front of the respective rows of pins 4. Slides 18 are normally held in raised position by suitable detent means 9 thereby locating a lug 18', at the lower end of each, in the horizontal plane of a fixed stop comprising a pin (not shown).

When carriage 19 is in its normal rightmost position, lug 18' of the left most slide 18 will engage the fixed stop thereby restraining said carriage from left shift movement. This slide will then be in position for depression under control of the ten key keyboard 11. Depression of this slide 18 will move its lug 18' from engagement with the fixed stop. Thereupon, carriage 19 will be released and will shift one ordinal position to the left where it will be arrested by engagement of lug 18' of the next lower order slide 18 with the fixed stop. This slide will now be in position for depression under control of the ten key keyboard. Thus slides 18 are adapted to be depressed successively from higher to lower orders to bring the respective rows of pins 4 in controlling position with respect to the successive higher order racks 3.

When pin carriage 19 (Fig. 11) is in its normal right end position, depression of any one of the digit keys 10 will set the corresponding pin 4 of the highest order pin row and will simultaneously depress the associated escapement slide 18. Pin carriage 19, therefore, will be shifted one ordinal position to the left to position the next lower order pin row and escapement slide 18 for setting operation upon the next key depression. However, depression of zero key 20, when carriage 19 is in rightmost position, will be ineffective to depress the highest order slide 18 and the carriage will not be shifted from home position. After the carriage 19 has been shifted from home position in response to depression of a digit key 10, depression of either a digit key 10 or zero key 20 will be effective to depress the associated escapement slide 18. The above shift control of pin carriage 19 by digit keys 10 and zero key 20 are essential in operation of the decimal location means as will later appear.

The highest order escapement slide 18 incorporates means for rendering depression of zero key 20 ineffective to depress said slide. Such means comprises a recess 18a in the top edge of the slide. The lower end 20a of the stem of zero key 20 is positioned immediately above recess 18a when pin carriage 19 is in its right end position. Consequently, upon depression of zero key 20, the lower end of its stem 20a will enter recess 18a without depressing slide 18 to release carriage 19.

Means for shifting carriage 19 (Fig. 11) upon depression of a 1–9 digit key 10 comprises a plunger 17 common to all of the keys. Plunger 17 is secured at its upper end on the cross member 15a of a bail 15 and extends downwardly to the rear of stem 20a of zero key 20. Thus when pin carriage 19 is in rightmost position, the end of plunger 17 is immediately above the highest order slide 18 to the rear of recess 18a.

Bail 15 is located beneath the key plate of the ten key keyboard and is normally spring biased to the clockwise position of Fig. 11. The stem of each of the 1–9 digit keys 10 has an appropriate shoulder or extension adapted, upon depression of the key, to rock bail 15 counterclockwise. Plunger 17, therefore, will engage the highest order slide 18 to the rear of recess 18a and carriage 19 will be shifted one order from its home position. Thereafter, either plunger 17 or stem 20a will be effective, upon depression, to engage the associated escapement slide 18 to release carriage 19.

After a value has been entered in pin carriage 19, racks 3, within the control range of said carriage, will be controlled in initial excursions by the settings of pins 4 during the first half of a machine cycle to adjust type wheels 301. During the second half of the cycle, the racks will be restored and pin carriage 19 will be shifted to normal right end position. The above operations are performed in the usual manner well known in the art.

*The printing mechanism (digit printing)*

The digit printing mechanism (Figs. 17A, 17B, 16, 20), except for design details adapting it for concomitant decimal printing, and its mode and principle of operation is well known in listing calculating machines. The operation of the various parts in proper timed relation is controlled by the usual cam cluster 345 through link connections 346 with the parts.

Each digit type wheel 301 of the printing mechanism has a reduced hub-portion 306 (Fig. 20) by which it is rotatably mounted at the upper left side of a hammer plate 304. Hub 306 extends through hammer 304, and at the right side of the hammer is fixed to a drive pinion 303 by riveted end 305. Hammers 304 are rockably mounted adjacent their lower ends on a common shaft 308 and are each spring biased counterclockwise by a spring 337. Combs 309 and 310 serve to hold hammers 304 is spaced relation and to guide them in printing operation.

Each hammer 304 is normally held clockwise against the bias of its spring 337 by a trigger 326. Triggers 326 are pivotally mounted forwardly of the upper ends of hammers 304 on a shaft 338 and are normally spring held counterclockwise each to engage a plug 331 at its rear end with a shoulder 332 at the upper end of a respective hammer 304. Upon clockwise movement of a trigger 326, lug 331 thereof will be moved above shoulder 332 thereby releasing the associated hammer. Lug 331 of each trigger 326 extends toward the right of the machine and underlies a nose 335 of the next lower order trigger. Therefore all lower order triggers are released in the usual manner in a printing operation.

Means for releasing each trigger 326 comprises a pawl 322 adjustably associated therewith. Pawl 322 is provided with a slot 327 through which extends a pin 325 on one side of the trigger. Pawl 322 extends forwardly and above trigger 326 and at its forward end has spring connection 323 with a lug at the upper edge of trigger 326 intermediate its ends. Pawl 322 therefore will normally be held downwardly (Figs. 16, 17A) with the upper end of slot 327 engaged with pin 325 and will be biased toward counterclockwise movement about said pin.

When the machine is in normal full cycle position pawls 322 are held rocked clockwise against the bias of springs 323 (Figs. 16, 17A) by segmental actuator racks 307 which respectively engage drive pinions 303 of type wheels 301. Racks 307 are pivotally mounted on a shaft 339 and are integral with segmental racks 340 which are engaged respectively with racks 3. Thus when racks 3 are in normal rearward position, racks 340 and 307 will be rocked clockwise. The front end of each rack 307 terminates in a beveled edge 321 which engages the rear of a lug 322a at the front of the associated pawl 322. Therefore with racks 307 in normal clockwise position, pawls 322 will be held clockwise about pins 325 against the bias of springs 323.

An operating bail 324 is pivotally mounted on a shaft 338 and extends transversely above pawls 322. Bail 324 is normally spring held counterclockwise and is adapted to be rocked clockwise upon each cycle of operation of the machine by a lever 341 which engages an extension 324a of said bail. With pawls 322 in normal clockwise position, a shoulder 322b at the upper front edge of each pawl will be below and out of the path of movement of bail 324.

A restore bail 328 extends transversely and to the rear of the upper ends of hammers 304. Bail 328 is mounted at the upper ends of a pair of levers 342 which are pivotally mounted on shaft 308 and are positioned at the opposite sides of the series of hammers 304. Bail 328 normally is in clockwise position and engages a shoulder adjacent the rear upper edge of each hammer 304. During each cycle of the machine, bail 328 is adapted to be rocked counterclockwise to permit hammers 304 to be fired.

A normally disengaged detent 317 is adapted to align each type wheel 301 prior to release of hammers 304 in a printing operation. Detent 317 is pivotally mounted at 316 on hammer 304 of the associated type wheel 301. Normally detent 317 is held in clockwise disengaged position against the bias of a spring 318 by engagement of its rearwardly extending end with the uppermost surface of the stepped arcuate face of comb 310. Comb 310 is supported at its ends by a pair of levers 311 which have pivotal mounting on shaft 308. During a machine cycle, levers 311 and comb 310 are rocked clockwise as shown in Fig. 17B. This will move the step of comb 310 to the front of the rear end of detent 317 which will then be rocked counterclockwise by spring 318 to engage an aligning recess 302 in the periphery of type wheel 301.

During the first half of a printing cycle, racks 3 (Fig. 16) will move in forward excursions thereby rocking segmental racks 307 and 340 counterclockwise to rotate type wheels 301. The extent of the excursions of racks 3 may be controlled by settings of pins 4 in carriage 19 (Fig. 11), or they may be controlled in a total taking operation for accumulator wheels 1 or for counter wheels 123. The counter register is non-shiftable and counter wheels 123 therefore are fixed in correct ordinal relationship with respect to the printing mechanism. When a total is to be taken from the accumulator register, carriage 2 is shifted to its left end position to locate accumulator wheels 1 in ordinally correct position. Type wheels 301 therefore will be rotated to the digital values corresponding to the setting of pin carriage 19 or to the digital values corresponding to the registration of counter wheels 123 or accumulator wheels 1. The present invention however is concerned only with a printing operation in connection with a total taken from the counter register in which the quotient is registered.

Upon counterclockwise movement of racks 307 and 340, beveled edges 321 of racks 307 will be moved from engagement with lugs 322a of the associated pawls 322. These pawls will therefore be released and will be rocked counterclockwise about pins 325 by springs 323 from the position of Fig. 17A. This will position shoulders 322b thereof in the path of operating bail 324. Also during the first half of the cycle, levers 342 and restore bail 328 supported thereby will be rocked counterclockwise so that type hammers 304 may be released for counterclockwise printing operation.

Actuator racks 3 (Fig. 16) will dwell after the above adjustments have been made and during this time the printing operation will be effected. First, however, comb 310 will be rocked from the position of Fig. 17A to the position of Fig. 17B. This will permit counterclockwise movement of detents 317 to engage recesses 302 thereby aligning wheels 301 for the printing operation. After this, bail 324 will be rocked clockwise and will thereupon engage shoulders 322b which are in its path of movement. Consequently pawls 322, whose shoulders 322b are engaged, will be rocked clockwise. Clockwise movement of pawls 322 will first move the top of slots 327 from engagement with pins 325 and engage the bottoms of the slots therewith. Then upon further clockwise movement of pawls 322, the associated triggers 326 will be rocked clockwise thereby releasing the respective hammers 304. Also any lower order hammer which is not released by its pawl 322 will be released by lug 331 of the next higher order hammer engaging its nose 335. Upon release of hammers 304, they will be operated counterclockwise by springs 337 to effect the printing operation of type wheels 301 as shown by the dot-dash position of Fig. 17A. After the printing operation, racks 3 will be restored to the rear as the machine completes the cycle and during this time the printing mechanism will be restored to the normal position.

*The printing mechanism (decimal printing)*

A normally disabled decimal type member 336 (Figs. 16, 17A, 17B, 20) is simultaneously operable with each digit type wheel 301, except that lowest order wheel, to print a decimal to the right of the printed digit. Decimal type member 336 is carried at the upper end of a slide 312 which has an arcuate lower end 315 and a longitudinal slot 314 through which passes shaft 308. Normally slide 312 is in lowered position (Figs. 16, 17A) with the upper end of slot 314 engaging shaft 308.

Each slide 312 extends upwardly at the right side of hammer 304 of the associated type wheels 301, and toward the rear from its lower end 315 to a distance above shaft 308. Above shaft 308, slide 312 is stepped to the left (Fig. 20) and extends upwardly in engagement with the back of hammer 304. Consequently when hammer 304 is rocked counterclockwise in operating movement, decimal slide 312 will be operated therewith. With slide 312 in normal lower position (Fig. 17A), decimal type 336 will travel in the lower dot-dash path below the printing line of the digit type and will not operatively engage platen 343. However when slide 312 is raised to the position of Fig. 17B as later described, decimal type 336 will be brought to printing line position and will be effectively operated with digit type wheel 301.

An ear 304a, at the rear of hammer 304 and to which spring 337 is fastened, is stepped to the right to form a shoulder which engages the rear of decimal slide 312. Therefore when hammer 304 is restored clockwise, ear 304a will operate to restore slide 312.

From the above, it will be seen that a decimal type 336 is not independently operable but is operated by hammers 304 of the associated type wheels 301. Therefore means is operable upon raising of each decimal type 336 to printing line position to condition the mechanism for operation of the associated type wheel 301. If such means were not provided, the decimal would not be printed in instances where there is no significant digit to the left of a decimal. Furthermore if there were zeros between the decimal and the first significant decimal digit neither the decimal point nor the zeros would be printed.

The conditioning means operable upon raising of each decimal type member 336 comprises a slide 320 guided by suitable combs at the rear of hammer 304 of the decimal type member. A lug 319 at the lower end of slide 320 overlies a shoulder 315a at the rear of arcuate end 315 of decimal slide 312 and the upper end of slide 320 engages the underside of a nose 330 of release pawl 322 for trigger 326 of hammer 304.

When a decimal slide 312 is raised as shown in Fig. 17B, shoulder 315a will engage lug 319 and raise slide 320. As slide 320 is raised, slot 327 will permit pawl 322 to be raised. This will bring shoulder 322b of the pawl into the path of operating bail 324. Therefore hammer 304 will be fired and the decimal will be printed regardless of the operation of rack 307 to release said pawl. After the printing operation, slides 312 and 320 will be restored by gravity.

A plunger 206 is operable to raise decimal slides 312 to effective operating position for quotient decimal printing. Plunger 206 is vertically mounted in a suitable bracket on a rack 200 which is transversely adjustable below arcuate ends 315 of decimal slides 312.

There are twelve wheels 123 (Figs. 1, 16) comprising the counter register in which a quotient is registered. When rack 200 is in normal transversely adjusted position, plunger 206 is located immediately below end 315 of decimal slide 312 of the twelfth order type wheel 301. With the parts in this position, upward movement of plunger 206 will raise the vertically aligned decimal slide 312 and a decimal will be printed to the right of the twelfth digit in a total taking operation of wheels 123 of the counter register to print a quotient. The transverse adjustment of rack 200 to locate plunger 206 will be described later.

After plunger 206 has been automatically positioned by the devices of the invention, later described, the positioned plunger will be raised by a bail 240 which is operable to raise the plunger in any transversely adjusted position.

Bail 240, as shown in Fig. 16, is operated by a crank 243. Crank 243 is rocked by an interponent comprising a rearwardly extending arm 244 pivotally mounted at its front on the depending arm of a crank 245 which is rocked during each machine printing cycle by a cam of cluster 345. A crank 246 has a rearwardly extending arm at the end of which a pin 246a engages the underside of arm 244. Normally an operating link 247 holds crank 246 clockwise with pin 246a holding arm 244 in the raised position of Fig. 16. Consequently upon each printing cycle, arm 244 will be moved to the rear by crank 245 and a shoulder 244a at the rear of said arm will pass idly above a pin 243a of crank 243.

Link 247 for rocking crank 246 may be operated in forward movement to enable interponent 244 by direct connection to one of the control keys generally indicated on keyboard 12 (Fig. 1) and which initiates a total taking operation for counter wheels 123 in which the quotient is registered. Optionally, however, link 247 could be operated by an individual key or lever which would be manually set before the total taking operation. Upon forward movement of link 247, crank 246 will be rocked counterclockwise thereby lowering arm 244. Consequently when arm 244 is moved to the rear during the subsequent total taking operation, shoulder 244a will engage pin 243a and rock crank 243 clockwise to raise plunger 206. This operation will occur during the first half of the cycle and will be completed before the printing operation. During the last half of the cycle the parts will be restored in the usual manner.

*General description of sequence of operations in decimal location and printing for the quotient*

In preparation for a division program, the dividend is entered in pin carriage 19 (Fig. 11) upon successive depression of digit keys 10 and zero key 20 of keyboard 11 (Fig. 1) corresponding to the digits of the dividend from higher to lower orders. If there is a decimal in the dividend, a decimal key 46 is depressed in proper sequence. From pin carriage 19, the dividend is transferred to the highest order accumulator wheels 1. To accomplish this, accumulator carriage 2 will be shifted to its rightmost position and as shown in Fig. 1, and pin carriage 19 will be shifted to its leftmost position. After this, dividend entering key 13 of keyboard 12 will be depressed.

In response to depression of dividend entering key 13, the dividend will be entered into the highest orders of rotary digital actuators 5. After this the actuators will be cycled once to enter the value in the highest order accumulator wheels 1. These operations, however as noted before, concern the invention only in the provision to register the quotient in correct ordinal relation to the decimal printing mechanism which will be automatically adjusted as later described.

After the above dividend entering operation, the divisor is entered in pin carriage 19 with decimal key 46 depressed in proper sequence. Pin carriage 19 is then shifted to its leftmost position and divisor entering key 14 is depressed. In response to depression of key 14, the divisor will be entered into the highest order digital actuators 5.

Subsequent to the divisor entering operation, operation of actuators 5 will be initiated in the performance of the division calculation. The initiating operation may be automatically effected subsequent to the divisor entering operation or it may be effected in response to depression of one of the unidentified control keys indicated on keyboard 12.

The division program may be performed by the well-known subtract, add and shift method; carriage 2 being shifted one ordinal position to the left after registration of each quotient digit in wheels 123 of the counter register. As noted before, a counting finger (not shown) is ordinally shifted toward the right from the highest order wheel 123 to operating relation with the successive lower order wheels as carriage 2 is shifted toward the left. The quotient will therefore be registered in the higher order wheels 123.

After registration of the quotient, a total taking operation of wheels 123 will effect printing of the quotient and decimal. The total taking operation for counter register wheels 123 is initiated upon depression of one of the unidentified control keys indicated on keyboard 12. As before noted, such total taking operation to zeroize a register to control excursions of racks, such as racks 3 of the present disclosure, to adjust type members in accordance with registered values is old and well known in the art; the devices of the invention being concerned solely with the provision for registration and printing in predetermined ordinal positions.

*The dividend and divisor entering keys*

The stem of key 13 (Figs. 1, 2, 3, 4A, 4B) is mounted for vertical movement in upper and lower plates of the keyboard. A shaft 355 is fixed at the top of the upper key plate and extends through a vertical slot in the stem of key 13. A depending arm 65 is pivotally mounted at its upper end on shaft 355 adjacent the front of the stem of key 13. The lower end of arm 65 engages a recess in the upper edge of a leftwardly extending slide 66 which is normally spring held in rightmost position. A stud 65a mounted intermediate the ends of arm 65 engages a cam slot 13a in the stem of key 13. Therefore upon depression of key 13, cam slot 13a, engaging stud 65a, will rock arm 65 clockwise and move slide 66 to the left.

Adjacent the left end of slide 66 is a cam edge 66a (Fig. 4B) which engages the lower edge of a bail 67, and to the right of edge 66a is a latch shoulder 66b. Upon leftward movement of slide 66, cam edge 66a will rock bail 67 counterclockwise and will move shoulder 66b to the left of the lower edge of bail 67. Bail 67 will thereupon engage shoulder 66b. Bail 67 will therefore be held rocked, and slide 66 and key 13 will be held against retraction.

A slide 140 latches decimal key 46 in depressed position. Slide 140 is spring urged toward the right with its right end 140a engaging the left side of key stem 45 of key 46 below a slot 45a in said key stem. Upon depression of key 46, slot 45a will be moved into registration with end 140a thereby permitting entry of said end to hold the key depressed.

When bail 67 is rocked counterclockwise, its upper edge will engage the upstanding left end 140b of latch slide 140 of decimal key 46. Slide 140 will thereupon be moved to the left to permit decimal key 46 to be spring retracted.

A push arm 356 (Figs. 2, 4B) is operated to release depressed dividend entering key 13. Arm 356 has a cam edge at its left upper end which engages the underside of a roller 67a on the rear arm of bail 67. Near the end of the dividend entering cycle, after pin carriage 19 has been restored, arm 356 will be moved toward the left. Upon leftward movement of arm 356, its cam edge engaging roller 67a will raise bail 67 thereby releasing slide 66. Slide 66 will thereupon be restored to the right thereby rocking arm 65 counterclockwise to raise key 13 by movement of stud 65a to the bottom of inclined slot 13a of the key stem. Arm 356 may be operated in correct timed relation with the printing cycle, for example, by an appropriate linkage from cam cluster 345 or from cam or lever means operated from any conveniently located cyclically driven machine member.

Divisor key 14 has, operationally associated therewith, parts including an arm 65 and slide 66 operable to raise bail 67 all as described in connection with key 13. Therefore, upon depression, key 14 and slide 66 will be latched by bail 67, and slide 140 will be restored to release decimal key 46. Then near the end of the divisor entering cycle, arm 356 will be operated to release the parts.

*Adjusting the decimal mechanism for printing the quotient*

Rack 200 (Figs. 16, 17A, 17B, 18, 19) is adjusted to locate plunger 206 for printing the quotient decimal in two stages; first in response to entry of the dividend and then in response to entry of the divisor.

Rack 200 is mounted in brackets 203, 205 for transverse movement below ends 315 of decimal slides 312. A pinion 152 fast at the rear of a forwardly extending shaft 151 engages teeth at the lower edge of rack 200. Shaft 151 is rotatably mounted adjacent its rear in an ear of bracket 203, and at its front end adjacent the lower left corner of a transverse vertical plate 121 (Figs. 12, 13). The front of the shaft is displaced to the left from axial alignment, as shown in Fig. 1, with respect to its rear and includes an intermediate obliquely extending section connected by universal couplings to transmit like rotation between the front and rear ends.

Fixed on shaft 151 adjacent the front left corner of plate 121 is a sprocket 112, and adjacent each of the other three corners of the plate are pulleys 115, 116 and 117 rotatably mounted respectively on studs 118, 119 and 120. An endless band 114 extends around sprocket 112 and pulleys 115, 116, 117 and has a decimal mark 122 on the outer surfaces of the band between upper pulleys 115, 116. This section of band 114 extends across the front of wheels 123 of the counter register and therefore band 114 may be adjusted to locate decimal mark 122 to visually point the quotient decimal.

A pinion 111 is fast on shaft 151 to the rear of plate 121 and engages a gear 100 rotatably mounted on a stud shaft 110 extending from the rear of plate 121. Rotatably mounted to the rear of gear 100, in spaced relation thereto on shaft 110, is a pair of ratchet wheels 96, 98 which are connected for rotation as a unit with gear 100 by a bolt 99. The teeth of ratchet wheels 96, 98 are reversed with respect to one another and wheel 96 is adapted to be driven counterclockwise (Fig. 14) by a finger 95 and wheel 98 is adapted to be driven clockwise by a finger 97 as later described.

Upon counterclockwise rotation of wheel 96, gear 100 will be rotated in like direction and sprocket 112 will be driven clockwise. Therefore the upper section of band 114 and decimal point 122 will be moved toward the right. Such adjustment is made upon entry of a dividend as later described. Conversely, upon clockwise rotation of wheel 98, band 114 and decimal point 122 will be adjusted to the left upon entry of a divisor.

Means is provided to locate decimal point 122 normally to the right of the highest order, i.e., the twelfth order wheel 123 (Figs. 1, 13) of the counter register. The locating means comprises a pair of locating arms 129, 130 each pivotally mounted at one end on stud shaft 110 between gear 100 and ratchet wheels 96, 98. A torsion spring 128 urges arms 129, 130 inwardly toward one another and into engagement with opposite sides of bolt 99 and shaft 151. This will locate wheels 96, 98 and connected gear 100 in a given angular position in which decimal point 122 will be normally located.

With decimal point 122 located in its normal position to the right of the twelth and highest order wheel 123, the previously described drive train connecting rack 200 (Figs. 18, 19) with band 114 will be transversely located to position plunger 206 beneath end 315 (Figs. 16, 17A, 17B) of the decimal slide 312 which will print the decimal to the right of the twelfth order printed digit. Consequently, as visual decimal point 122 is ordinally shifted with respect to wheels 123, plunger 206 will be shifted accordingly and the decimal will be printed in the corresponding ordinal position.

Upon rotation of wheels 96, 98 and gear 100 (Figs. 12, 13, 14) bolt 99 will rock one or the other of arms 129, 130 against the tension of torsion spring 128. Detent means comprising a roller 124 engaging the teeth of ratchet 96 holds the parts in rotated position. Roller 124 is at the end of an arm of a crank 125 which is urged clockwise by a spring 127 to yieldably engage the roller with the ratchet 96. Torsion spring 128 is not strong enough to overcome the urge of detent spring 127. Therefore, the parts will remain in adjusted position for a total taking operation of the counter register to print the quotient with the decimal.

In preparation for a subsequent machine operation, shaft 132 of counter wheels 123 is rotated. This may be in conjunction with an automatic preclearing operation for the counter register or it may be manually performed. Upon rotation of shaft 132, cam means 131 will depress a slide 133 which will rock crank 125 counterclockwise to release ratchet 96. The parts will thereupon be rotated to normal by spring 128 and decimal point 122 will be restored to the right of the highest order wheel 123.

The ordinal steps of adjustment of decimal point 122 which are made, as determined by the various digital and decimal combinations of the dividend of the divisor in response to entry thereof in effecting the decimal setting for the quotient, will first be described with reference to Fig. 5 after which the mechanisms for performing the adjustments will be described.

Figure 5:
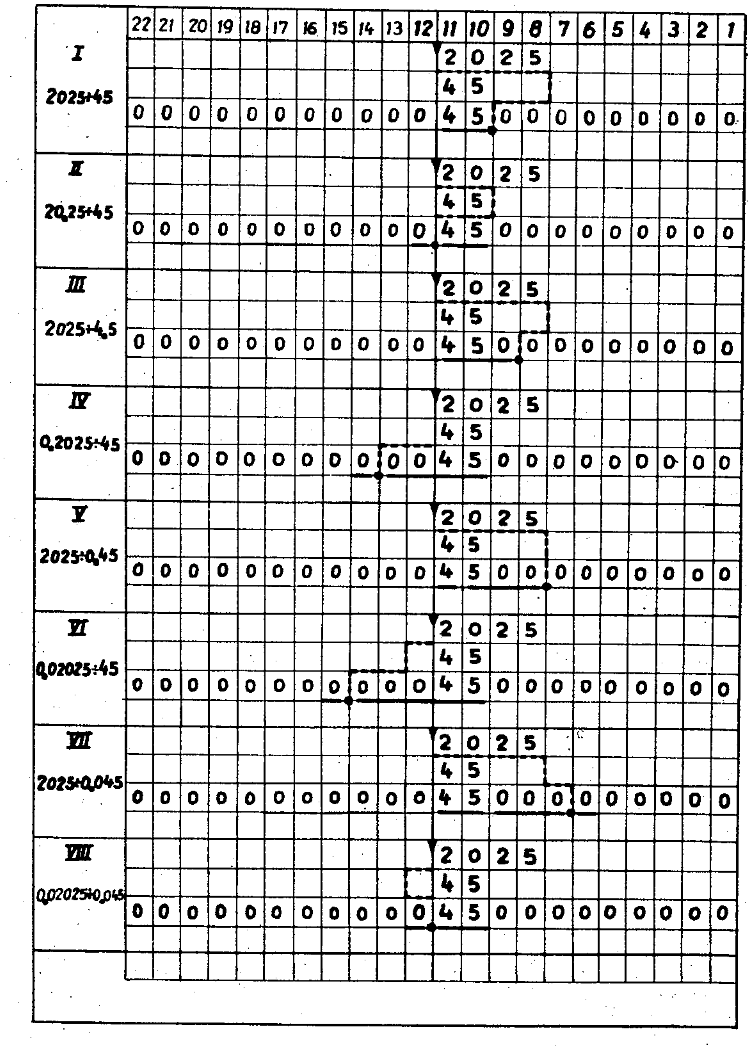
Fig. 5 is a diagrammatic view of the steps of movement of the decimal point to position for quotient printing in a number of division calculations.

There is illustrated, in Fig. 5, a series of division examples wherein the same combination of digital values, i.e., 2025÷45=45 is used with the decimal point in various combinations of positions which may occur.

In each example, I–VIII, the dividend and divisor are shown in the leftmost column. The dividend, divisor and quotient are shown below each other in ordinal position with respect to the twenty-two orders of the printing mechanism. The normal or home position of decimal point 122 and plunger 206 are indicated by an arrow. A dotted line shows the path of movement of the decimal point and plunger in response to entry of the dividend, and then upon entry of the divisor to final position. The decimal point is indicated as printed with the quotient.

EXAMPLE I.—2025÷45=45

Figure 2:
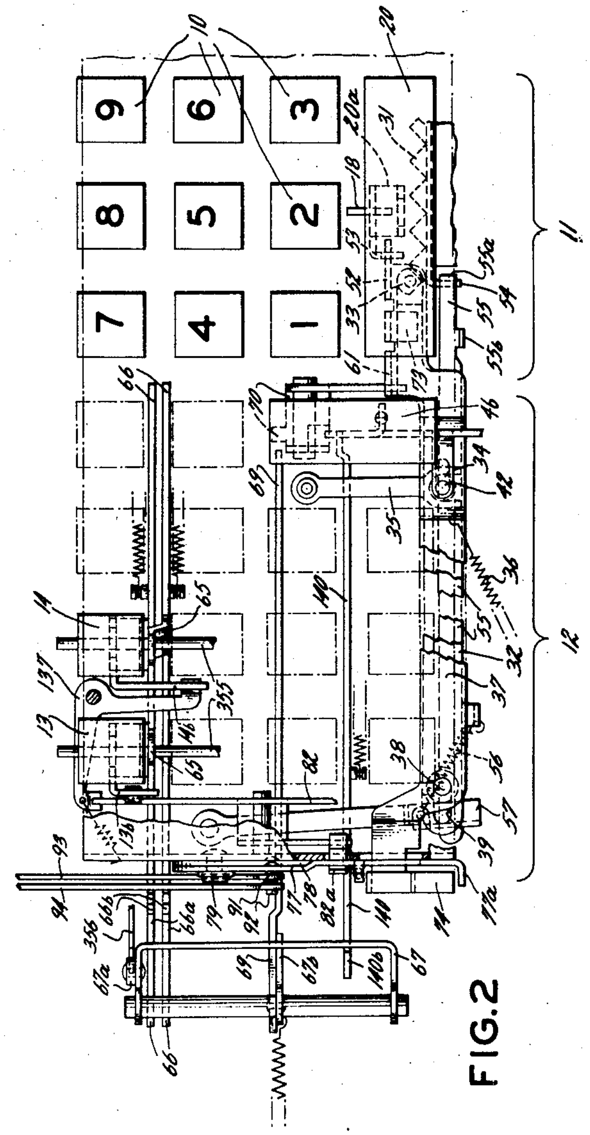
Fig. 2 is an enlarged plan view of the keyboard.

The dividend is entered in pin carriage 19 upon depression of the corresponding keys of the ten key keyboard 11 (Figs. 1, 2, 11). There are no decimal digits and therefore decimal key 46 is not depressed. The dotted line indicates that the decimal point is stepped one ordinal position to the right in response to the entry of each digit including the zero. After this, dividend entering key 13 is depressed and the pin carriage is restored. Then the divisor is entered in the pin carriage upon depression of the corresponding keys of keyboard 11. There are no decimal digits and decimal key 46 is not depressed. The dotted line indicates that the decimal point is stepped one ordinal position to the left in response to entry of each digit. This would also apply to a zero if included in the number. The divisor entering key 14 is then depressed and the pin carriage restored.

After registration of the quotient in counter wheels 123, a total will be taken from the wheels and the quotient with the decimal will be printed. It will be noted that if the highest order of the dividend were greater than the highest order of the divisor, instead of less as in the present examples, the highest order of the quotient would be registered in the twelfth instead of the eleventh order. It will be seen that in either instance, the decimal will be correctly located.

EXAMPLE II.—20.25÷45=.45

The dividend is entered in pin carriage 19 upon depression of the corresponding keys of the keyboard including decimal key 46. It will be noted that depression of the decimal key disables the means which shifts the decimal point to the right in response to entry of the digits of the dividend. Therefore there is no further shift upon entry of the decimal digits.

EXAMPLE III.—2025÷4.5=450

In this example, it is shown that depression of the decimal key in entry of the divisor disables the means which shifts the decimal to the left in response to entry of the digits of the divisor. Therefore there is no further shift upon entry of the decimal digits.

Examples IV and V show that if either the dividend or the divisor comprises only decimal digits, that is, no digits to the left of the decimal point, depression of decimal key 46 disables the decimal shifting mechanism so that there is no shift at all upon entry of the respective dividend or divisor. This, however, does not apply if one or more zeroes immediately follow the decimal point as shown in Examples VI, VII and VIII. In such an instance, the decimal point is shifted in response to each depression of zero key 20 following depression of decimal key 46. The direction of shift, however, is reversed with respect to the direction of shift which is effected in response to entry of digits before a decimal point, as above described, respectively, for dividend or divisory entry. After depression of the zero key and attendant decimal shift, the shifting mechanism will be disabled without further shifting operation upon depression of a 1 to 9 digit key 10.

*Details of the adjusting means for the decimal mechanism*

Finger 95 (Figs. 12, 14) is adapted to be raised and thereby step ratchet wheel 96 counterclockwise to ordinally shift decimal point 122 and plunger 206 to the right through a drive train previously described. Conversely finger 97 is adapted to be raised and thereby step ratchet wheel 98 clockwise to shift the decimal point and plunger toward the left.

Finger 95 extends upwardly from the end of a horizontal arm of a crank **95*a* which is spring urged clockwise and has its upper operating end normally disengaged from ratchet wheel 96 but immediately below the teeth at the right edge thereof. Therefore if crank 95*a* is rocked counterclockwise, finger 95 will be raised to engage a tooth of wheel 96 thereby imparting one step of counterclockwise movement to said wheel. Finger 97 extends upwardly from the end of a horizontal arm of a crank 97*a* which is spring urged clockwise and has its upper operating end normally disengaged from ratchet wheel 98 but immediately below the teeth at the left edge thereof. Therefore if crank 97*a* is rocked counterclockwise, finger 97 will be raised to engage a tooth of wheel 98** thereby imparting one step of clockwise movement to said wheel.

A forwardly extending link 93 (Figs. 4A, 12, 14, 15) is connected at its rear to the vertical arm of crank **95*a* and a forwardly extending link 94 is connected at its rear to the vertical arm of crank 97*a*. At its front, link 93 has connection 91 with a right shift arm 77, and link 94 has connection 92 with a left shift arm 78. Arms 77, 78 extend from front to rear in vertically opposed relationship and are adapted for longitudinal sliding movement and for pivotal movement on common slot and pin mounting 79** at their rear.

Arm 77 is above arm 78 and its front end terminates in a leftwardly extending lug **77*a*. The lower edge of arm 77 extends a short distance to the rear from lug 77*a* to a shoulder 77*b*. Likewise the front end of arm 78 terminates in a lug 78*a* and its lower edge extends rearwardly to a shoulder 78*b*. Arms 77, 78 are urged toward one another by a connecting spring 80 to bring lugs 77*a*, 78*a* and shoulders 77*b*, 78*b*** into aligned engagement.

Normally arms 77, 78 are held to the rear by the spring biased cranks **95*a*, 97*a* to which they are connected. As later described, arm 77 is adapted to be moved forwardly thereby rocking crank 95*a* counterclockwise to raise finger 95 which will then engage and step ratchet wheel 96 to adjust decimal mark 122 one ordinal position to the right. In like manner, arm 78 is adapted to be moved forwardly to step ratchet wheel 98** to adjust the decimal point one ordinal position to the left.

Arms 77, 78 are adapted to be rocked as a unit on their rear pivotal mounting 79 under control of dividend and divisor entering keys 13, 14 (Figs. 1, 2, 3, 4A). Arms 77, 78 are normally in lowered clockwise position (Figs. 4A, 12, 15) and rest upon an arm **82*a* extending to the left from the front arm of a rearwardly extending lever 82 which is spring biased clockwise. A lug at the rear of lever 82 underlies and is engaged by an extension 13*b* of the stem of dividend entering key 13. Upon depression of key 13, extension 13*b* will rock lever 82 counterclockwise and arm 82*a* will raise the front ends of arms 77, 78** as shown by the dot-dash lines (Figs. 12, 15).

Latching means comprising a crank 137 will hold the parts in adjusted position when lever 82 is rocked counterclockwise by key 13. When lever 82 is rocked, its rear end will engage the leftward extending arm of crank 137 thereby rocking said crank clockwise against a spring bias. As the rear end of lever 82 passes below and from engagement with the arm of crank 137, the crank will be rocked counterclockwise to move its arm into latching position over the end of lever 82.

Arms 77, 78 will be held in counterclockwise raised position until depression of divisor entering key 14. Upon depression of this key, an extension **14*b* of its stem will engage the forwardly extending arm of latch crank 137. This will rock crank 137 clockwise to move its left arm from latching position over the rear end of lever 82. Lever 82 therefore will be restored, and arms 77, 78** will drop to their normal lowered position.

From the above, it will be seen that decimal shift arms 77, 78 will be in normal lowered position while the dividend is entered into pin carriage 19 and that the arms will be in raised position while the divisor is entered in the pin carriage. Mechanism, now to be described, is operable, upon entry of the dividend into pin carriage 19 and then again upon entry of the divisor, to adjust decimal point 122 as determined by the respective lowered and raised positions of shift arms 77, 78.

Figures 4A, 4B:
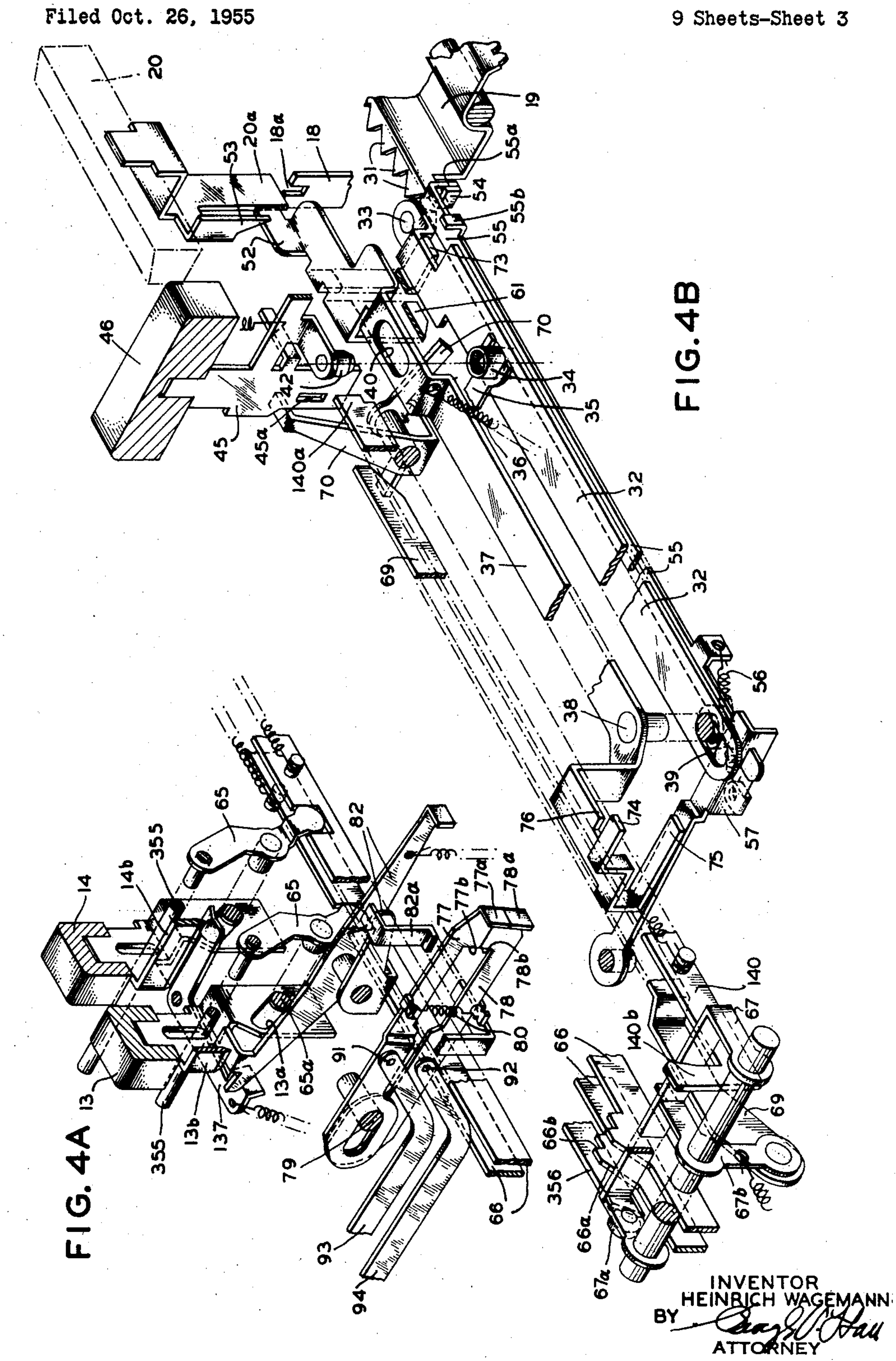
Fig. 4A is a fragmentary perspective of the dividend and divisor entering key and associated mechanism.
Fig. 4B is a fragmentary perspective of the zero key of the ten key keyboard, the decimal key, and associated mechanism.

A primary (Figs. 2, 3, 4B, 8, 9, 10) operating lever 32 extends transversely below the keyboard and is fulcrumed on a stud 34 on the upper face of a fixed plate 360 (not shown in Figs. 4B, 10). Lever 32 is adapted to be raised at its right end on stud 34 but is normally held resiliently downward by a spring finger 35 with its lower face engaging plate 360. The right end of lever 32 extends to the right beyond plate 360 and depending from its lower right end is a stud 33. Normally stud 33 is immediately adjacent the left side of the left most tooth of a rack 31 which is directly connected for shifting movement with carriage 19.

Mounted atop of primary lever 32 and extending longitudinally therewith is a secondary operating lever 37. A stud 38 fixed inwardly from the left end of lever 37 extends downwardly through a longitudinal slot 39 adjacent the left end of primary lever 32. The end of stud 38 terminates in an enlarged head which extends a distance below plate 360 through a cutout therein.

A forwardly extending arm 57 has pivotal mounting at its rear on plate 360 and is stepped downwardly at its front end through a cutout in plate 360 to a position to the left of and in the plane of the lower end of stud 38.

A link 55 extends longitudinally of lever 32 below plate 360. The left end of link 55 is slidably supported in a slot adjacent the forward end of arm 57, and a spring 56 extends between a lug to the right of the rear end of link 55 and a lug to the rear of the slot of arm 57 to provide a resilient connection. The right end of link 55 terminates in a downwardly turned lug **55*a* which is normally engaged, at its inner face, by a forwardly turned lug 54 at the left end of rack 31. Spring 56 biases link 55 counterclockwise about its slot support on arm 57 and thereby maintains lug 55*a* engaged with lug 54 of rack 31**.

When pin carriage 19 and rack 31 are in normal right end position, lug 54 will hold link 55 toward the right. Spring 56, therefore, will bias arm 57 counterclockwise into engagement with the lower end of stud 38. Thus stud 38 will be held at the right end of slot 39 of lever 32. Normally, therefore, lever 37 will be held toward the right with respect to lever 32.

Means is provided to rock link 55 clockwise upon depression of a 1–9 digit key 10 thereby removing lug **55*a* from engagement with lug 54 or rack 31. Such means comprises an upstanding lug 55*b* at the front of link 55 adjacent its right end 55*a*. A finger 60 (Fig. 11) depending from pin carriage escapement lever 15 is normally located to the rear of lug 55*b*. When lever 15 is rocked upon depression of a 1–9 digit key 10, finger 60 will engage lug 55*b* and rock link 55 clockwise to disengage lug 55*a* from lug 54**. This will free the entrained parts for leftward movement as described later.

A spring 36 (Figs. 4B, 10) is connected to lever 37 between stud 38 and its right end. This spring biases lever 37 clockwise around stud 38 and toward the left against the urge of arm 57 which is biased by spring 56. Spring 36, however, is weak with respect of spring 56 which normally holds lever 37 to the right. A lug 73 at the rear edge of lever 37 adjacent its right end extends forwardly in engagement with the under face of lever 32 thereby providing a connection between the levers. It will be observed that lug 73 will permit counterclockwise movement of lever 37 at stud 38 independently of lever 32. However, if lever 37 is raised at its right end, as later described, lug 73 will likewise raise lever 32. Furthermore, if lever 32 is rocked counterclockwise about its fulcrum stud 34, lug 73 and stud 38 will be effective to likewise rock lever 37.

Lever 37 terminates, at its right rear end, in an upstanding lug 52. Lug 52 is adapted for engagement by a cam lug 53 extending from the left edge of the stem of zero key 20. Lug 52 of lever 37 is normally in the path of movement of lug 53 upon depression of key 20. Consequently when key 20 is depressed, lug 53 will engage lug 52 and rock lever 37 counterclockwise. As later described, lever 37 is adapted to be moved to the left to remove lug 52 from the path of lug 53.

Lever 37 has a raised intermediate section which passes above stud 34 on which lever 32 is fulcrumed, and is provided thereat with a longitudinal slot 40. Slot 40 is adapted for the entrance of a pin 42 which depends from an extension of stem 45 of decimal key 46. When the parts are in normal position, pin 42 is above the left end of slot 40 (Figs. 4B, 8) and disengaged therefrom. Upon depression of key 46, pin 42 will enter slot 40 thereby providing a fulcrum for lever 37 which fulcrum is axially aligned with fulcrum stud 34 of lever 32.

Pin 42 is tapered at its lower end so that when it passes downwardly through slot 40 it will engage an opposed recess at the top of stud 34 to definitely hold the respective fulcrums aligned. Furthermore, pin 42 is of such length as will permit the right end of lever 37 to be raised when said pin is in lowered position through slot 40 and engaged with the recess of stud 34.

When decimal key 46 is depressed and latched by latch slide 140, a crank 70 will be rocked and held counterclockwise. Crank 70 comprises an upstanding arm having a lug at its end which engages the rear of stem 45 of decimal key 46 as best seen in Fig. 4B. The other arm of crank 70 extends forwardly and is normally positioned to the left of a cam lug 61 which extends downwardly from the rear edge of lever 37. When crank 70 is in normal clockwise position, the upper front end of the forward arm is below the plane of the lower left operating edge of cam lug 61. However, when key 46 is depressed, a cam edge at the rear edge of its stem 45 will engage the lug at the end of the upstanding arm of crank 70 thereby rocking said crank counterclockwise and raising the front end of its forwardly extending arm. The front end of the arm will therefore be located in the path of movement of cam lug 61 when lever 37 is moved to the left as later described.

The left end of lever 37 is adapted to operate right and left shift arms 77, 78. The left end of the lever comprises an upper forwardly extending finger 74 and a lower forwardly extending finger 75 (Figs. 4B, 9, 12, 15). The front edge of lever 37 is cut inwardly to form a reduced portion extending to the right from fingers 74, 75 to form a shoulder 76. The reduced portion of lever 37 extends between arms 77, 78 through an opening to the rear of shoulders **77*b*, 78*b***.

The following is the normal position of fingers 74, 75 and shoulder 76 with respect to arms 77, 78 when said arms are in normal lowered position (Figs. 12, 15) and pin carriage 19 is in normal right end position. Fingers 74, 75 will both be to the rear of lugs **77*a*, 78*a*. Finger 74 will be above the horizontal plane of lug 77*a* but finger 75 will be in the horizontal plane of lug 78*a*. Shoulder 76 will be to the right of arms 77, 78 (Fig. 2) but in the horizontal plane of shoulder 77*b***.

If a 1–9 digit key is depressed with carriage 19 in normal right end position, finger 60 (Fig. 11) of escapement lever 15 will engage lug **55*b* of link 55 and rock said link clockwise (Figs. 4B, 10) to disengage lug 55*a* from lug 54 of rack 31 of said carriage. Subsequent to this operation plunger 17 will depress the leftmost escapement slide 18 to permit one ordinal left shift of carriage 19**.

Upon disengagement of lug **55*a*, link 55 and arm 57 connected therewith will be released. This will permit leftward movement of lever 37 under the urge of spring 36. This will move fingers 74, 75 to the left of lugs 77*a*, 78*a* for idle operation. Shoulder 76, however, will be moved to the left of shoulders 77*b*, 78*b*. Consequently, with arms 77, 78 lowered, the front edge of lever 37 to the right of shoulder 76 will be in the horizontal plane of shoulder 77*b*. With the parts so adjusted, the subsequent shift of pin carriage 19** will effect the following operation.

The leftmost tooth of rack 31, will engage stud 33 and rock lever 32 counterclockwise about stud 34. Like rocking movement will be transmitted to lever 37 through lug 73 at its right end and stud 38 adjacent its left end. This rocking movement of lever 37 will engage its front edge with shoulder **77*b* thereby pulling arm 77** forwardly to step the decimal mechanism one ordinal position toward the right.

After pin carriage 19 has been initially shifted from home position, subsequent depression of either zero key 20 or a digit key 10 will effect one ordinal carriage shift. Consequently for each ordinal shift of the carriage, the decimal mechanism will be stepped one ordinal position to the right. This is illustrated for dividend entry in Examples I, III, V and VII of Fig. 5.

When arms 77, 78 are raised upon depression of dividend entering key 13, shoulder **77*b* will be raised above the front edge of lever 37 and shoulder 78*b* will be raised into its horizontal plane. Consequently each ordinal shift of pin carriage 19 and operation of lever 37** will effect an ordinal step of the decimal mechanism to the left as shown for divisor entry in Examples I, II, IV and VI of Fig. 5.

When decimal key 46 is depressed after pin carriage 19 has been shifted one or more ordinal positions from home position in dividend or divisor entry, lever 37 will be disabled to shift the decimal mechanism in response to subsequent shift of said carriage. The disablement of lever 37 will be effected by crank 70 which is rocked upon depression of decimal key 46. When lever 37 is moved to the left upon initial shift of pin carriage 19, lug 61 of said lever will be moved from normal position to the right of the forward arm of crank 70 to a position above said arm. Consequently, when crank 70 is rocked, its forward arm will engage lug 61 thereby raising the right end of lever 37 and lever 32 which is connected thereto by lug 73. This will raise stud 33 at the end of lever 32 above and out of the path of movement of rack 31 and therefore subsequent shift of the pin carriage will be ineffective to operate the decimal shifting mechanism. This operation is illustrated for dividend entry in Example II of Fig. 5 and for divisor entry in Example III.

Lever 37 will be disabled if decimal key 46 is depressed first and then followed by depression of a 1 to 9 digit key 10. In this instance, crank 70 will be in rocked position when lever 37 is moved to the left in response to depression of a key 10, and consequently the front arm of crank 70 will be in the path of leftward movement of lug 61 of lever 37. Lug 61 therefore will engage the arm of crank 70 to lift the right ends of levers 32, 37 to disable the decimal shift mechanism before the subsequent shift of carriage 19. This operation is illustrated for dividend entry in Example IV of Fig. 5 and for divisor entry in Example V.

When the parts are in normal position, depression of zero key 20 will be ineffective to shift carriage 19 from its right end position because the end of its stem will idly enter recess 18*a* (Figs. 11, 4B) of the leftmost escapement slide 18. However, lug 53 of the stem will engage lug 52 at the right end of lever 37 and rock said lever counterclockwise about its fulcrum 38. This operation, however, will be idle because the arcuate swing of the left end of lever 37 is insufficient to bring finger 75 into engagement with lug 78*a*.

Depression of decimal key 46, with the parts in the above normal position, will render lever 37 effectively operable in response to subsequent depression of zero key 20. Upon depression of decimal key 46, pin 42 thereof will enter slot 40 of slide 37 to provide a fulcrum adjacent its right end. Therefore upon depression of zero key 20, levers 32 and 37 will be rocked counterclockwise as a unit about the fulcrum comprising stud 34 and axially aligned pin 42. Finger 75 will therefore travel through an arc sufficient to engage it with lug 78*a* and thereby pull arm 78 forwardly to step the decimal mechanism one ordinal position to the left as illustrated for dividend entry in Examples VI and VIII of Fig. 5.

After the above operation, depression of a 1–9 digit key 10 will cause movement of lever 37 to the left, as previously described, and its consequent disablement with respect to rack 31 of carriage 19. Additionally, the leftward movement of lever 37 will remove its lug 52 at its right end from the path of movement of lug 53 of zero key 20. Subsequent depression of zero key 20, therefore, will be ineffective with respect to the decimal shift mechanism.

When arms 77, 78 are in raised position after depression of dividend entering key 13, lug 78*a* will be raised above the horizontal plane of finger 75 and lug 77*a* will be moved into the horizontal plane of finger 74. With the parts in this position and pin carriage 19 in normal right end position, finger 74 will be idly operated upon depression of zero key 20 but will be effective to operate arm 77 if decimal key 46 is first depressed. In this instance, the decimal mechanism will be stepped one position to the right as shown for divisor entry in Examples VII and VIII of Fig. 5. After this, depression of a 1–9 digit key 10 will disable lever 37 as described in connection with dividend entry.

It will be recalled that upon depression of either dividend entering key 13 or divisor entering key 14, bail 67 is rocked and held thereby moving lock slide 140 to the left to release decimal key 46. This would release crank 70 and lever 37 would be re-enabled to operate the decimal shift mechanism which would be operated upon return of pin carriage 19 during a dividend or divisor entering operation. This would give an incorrect decimal setting and therefore means comprising a transverse cam slide 69 (Figs. 2, 4B) is provided to hold crank 70 rocked after release of decimal key 46.

Slide 69 has a cam edge at its lower right end which overlies a rearwardly extending arm of crank 70. At its left end, slide 69 has pivotal connection at the end of a depending arm of a crank 67*b*, the other arm of which is connected to bail 67. When bail 67 is rocked and held upon depression of key 13 or 14, crank 67*b* will move slide 69 to the right so that its lower edge will engage the rear arm of rocked crank 70 thereby holding said crank. In an instance where decimal key 46 is not depressed, as in Example 1 (Figure 5), the cam edge of slide 69 will depress the rear arm of crank 70 to rock the crank. Near the end of the factor entering cycle when bail 67 is released, slide 69 will be restored to release crank 70.

I claim:

1. In a calculating machine, the combination with means for entering a dividend and a divisor into said machine including digital value keys adapted for depression successively in accordance with the corresponding ordinally successive digital values respectively of a dividend and of a divisor, and printing mechanism including an ordinal series of differentially settable digital type members operable to print a quotient; of decimal type mechanism ordinally adjustable for operation successively with respect to the orders of said digital type members, shift means operable to effect an ordinal step of adjustment of said decimal type mechanism in either direction in response to depression of each of said digital value keys and adjustable to a disabled position, means for controlling the adjustment of said shift means including a decimal key adapted for depression in proper decimal sequence upon successive depression of said digital value keys, and means for controlling the direction of operation of said shift mechanism in said dividend and divisor entering operations respectively.

2. The invention according to claim 1; said means for controlling the adjustment of said shift means being operable in response to depression of said decimal key to adjust said shift means to disabled position.

3. The invention according to claim 2; said means for controlling the direction of operation of shift means being operable to control the direction of operation in a given direction upon entry of a dividend and in the reverse direction upon entry of a divisor.

4. In a calculating machine, the combination with means for entering a dividend and a divisor into said machine including 0 to 9 digital value keys adapted for depression successively in accordance with the corresponding ordinally successive digital values respectively of a dividend and of a divisor, and printing mechanism including an ordinal series of differentially settable digital type members operable to print a quotient; of decimal type mechanism ordinally adjustable for operation successively with respect to the orders of said digital type members, shift means operable to effect an ordinal step of adjustment of said decimal type mechanism in either direction in response to depression of each of said digital value keys and adjustable to a disabled position, a decimal key adapted for depression in proper decimal sequence upon successive depression of said digital value keys, means operable to adjust said shift means to disabled position upon depression of said decimal key, and means for controlling the direction of operation of said shift means in said dividend and divisor entering operations respectively.

5. The invention according to claim 4; said means for adjusting said shift means to disabled position upon depression of said decimal key being normally disabled and being enabled in response to operation of said shift means prior to said decimal key depression.

6. The invention according to claim 5; said normally disabled means for adjusting said shift means to disabled position being rendered operable subsequent to depression of said decimal key in response to depression of any one of said 1 to 9 digit keys.

7. In a calculating machine, the combination with means for entering a dividend and a divisor into said machine including 0–9 digital value keys adapted for depression successively in accordance with the corresponding ordinally successive digital values respectively of a dividend and of a divisor, and printing mechanism including an ordinal series of differentially settable digital type members operable to print a quotient; of decimal type mechanism ordinally adjustable for operation successively with respect to the orders of said digital type members, shift means operable to ordinally step said decimal type mechanism in either direction, settable drive means when unset normally ineffective for operation upon depression of said 0 key and effective in response to each depression of a 1 to 9 key and each subsequent depression of said 0 key to operate said shift means to effect an ordinal step of adjustment of said decimal mechanism in a given direction and adjustable to a disabled position, a direction control key operable to set said drive means thereby reversing its operation with respect to said shift means, a decimal key adapted for depression in proper decimal sequence upon successive depression of said digital value keys, and means operable to adjust said drive means to disabled position in response to depression of said decimal key.

8. The invention according to claim 7; said means operable to adjust said shift drive means to disabled position upon depression of said decimal key being normally disabled and enabled upon initial operation of said shift means prior to said decimal key depression, depression of said decimal key prior to initial operation of said shift means being operable to enable shift drive means when unset to operate said shift means to step said decimal type mechanism one ordinal step in the direction opposite to said given direction in response to each immediately subsequent depression of said 0 key and in said given direction when said drive means is set, and said means operable to adjust said shift drive means to disabled position being operable when said decimal key is in depressed position upon operation of said shift means in response to depression of a 1 to 9 digit key.

9. In a calculating machine, the combination with means for entering a dividend and a divisor into said machine including a 0 to 9 series of digital value keys adapted for depression successively in accordance with the corresponding ordinally successive digital values respectively of a dividend and of a divisor, an ordinally shiftable set-up carriage normally located in a home position, and carriage shift means operable in response to each key depression to shift said carriage one ordinal step of movement in a given direction, and printing mechanism including an ordinal series of differentially settable digital type members operable to print a quotient; of decimal type mechanism ordinally adjustable for operation successively with respect to the orders of said digital type members, means for disabling said carriage shift means for operation in response to depression of the 0 digit key when said carriage is in home position, decimal shift means operable to ordinally step said decimal type mechanism in either direction, settable drive means when unset normally effective in response to each ordinal shift of said carriage to operate said decimal shift means to effect one ordinal step of said decimal mechanism in a given direction and adjustable to a disabled position, a decimal key, means conjointly operable in response to depression of said decimal key and movement of said carriage from home position to adjust said drive means to disabled position, means operable upon depression of said decimal key with said carriage in home position to render said drive means when unset effective in response to depression of said 0 digit key to operate said decimal shift means to effect one ordinal step of said decimal mechanism oppositely to said given direction, and a direction control key operable to set said drive means thereby reversing its operation with respect to said decimal shift means.

References Cited in the file of this patent

UNITED STATES PATENTS

| | | |
|---|---|---|
| 1,371,138 | Bair | Mar. 8, 1921 |
| 1,580,858 | Schluns | Apr. 13, 1926 |
| 2,467,419 | Avery | Apr. 19, 1949 |
| 2,688,439 | Landsiedel | Sept. 7, 1954 |
| 2,702,159 | Reppert | Feb. 15, 1955 |
| 2,768,786 | Reppert | Oct. 30, 1956 |

FOREIGN PATENTS

| | | |
|---|---|---|
| 677,617 | Germany | June 29, 1939 |

UNITED STATES PATENT OFFICE

CERTIFICATE OF CORRECTION

December 15, 1959

Patent No. 2,917,232

Heinrich Wagemann

It is hereby certified that error appears in the printed specification of the above numbered patent requiring correction and that the said Letters Patent should read as corrected below.

Column 2, line 63, after "racks" insert -- 3 --; column 5, line 66, for "plug" read -- lug --; column 7, line 48, for "that" read -- the --; column 11, line 73, after "dividend" insert -- and --; column 14, line 64, for "or" read -- of --; column 18, line 62, for "ar" read -- an --.

Signed and sealed this 14th day of June 1960.

(SEAL)
Attest:

KARL H. AXLINE
Attesting Officer

ROBERT C. WATSON
Commissioner of Patents